(12) United States Patent
Shin et al.

(10) Patent No.: US 11,694,315 B2
(45) Date of Patent: Jul. 4, 2023

(54) ARTIFICIAL INTELLIGENCE SOFTWARE FOR DOCUMENT QUALITY INSPECTION

(71) Applicant: KYOCERA Document Solutions Inc., Osaka (JP)

(72) Inventors: Kilho Shin, Los Angeles, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 252 days.

(21) Appl. No.: 17/243,887

(22) Filed: Apr. 29, 2021

(65) Prior Publication Data

US 2022/0351356 A1 Nov. 3, 2022

(51) Int. Cl.
*G06T 7/00* (2017.01)
*G06N 3/08* (2023.01)

(52) U.S. Cl.
CPC .............. *G06T 7/0002* (2013.01); *G06N 3/08* (2013.01); *G06T 2207/20076* (2013.01); *G06T 2207/20081* (2013.01); *G06T 2207/20084* (2013.01); *G06T 2207/20224* (2013.01); *G06T 2207/30168* (2013.01)

(58) Field of Classification Search
CPC ......... G06T 7/0002; G06T 2207/20076; G06T 2207/20081; G06T 2207/20084; G06T 2207/20224; G06T 2207/30168; G06N 3/08; G06N 3/045; G06N 3/084
See application file for complete search history.

(56) References Cited

U.S. PATENT DOCUMENTS

| | | | |
|---|---|---|---|
| 9,544,447 B2 | 1/2017 | Shijoh | |
| 2018/0082115 A1 | 3/2018 | Itan et al. | |
| 2018/0131815 A1* | 5/2018 | Spivakovsky | G06V 10/25 |
| 2019/0197679 A1* | 6/2019 | Fang | G06N 3/084 |
| 2019/0377047 A1* | 12/2019 | Chen | G01R 33/5608 |
| 2020/0175672 A1* | 6/2020 | Tanaka | H04N 1/4115 |
| 2021/0031507 A1* | 2/2021 | Haik | G06T 7/001 |
| 2021/0337073 A1* | 10/2021 | Lin | G06T 7/0004 |
| 2022/0005159 A1* | 1/2022 | Guan | G06T 5/002 |
| 2022/0080672 A1* | 3/2022 | Kothari | B33Y 50/02 |
| 2022/0309634 A1* | 9/2022 | Atwood | G06V 10/82 |

OTHER PUBLICATIONS

Tang, S., et al., "Online PCB Defect Detector on a New PCB Defect Dataset", arXiv:1902.06197v1 [cs.CV] Feb. 17, 2019.*

* cited by examiner

*Primary Examiner* — Xuemei G Chen
(74) *Attorney, Agent, or Firm* — GrowIP Law Group LLC

(57) ABSTRACT

A system employs a trained model to detect artifact(s) associated with artifact type(s) appearing in a reproduction of a source image (a test image). The system determines differences between the test image and the source image and outputs probabilities that the artifact(s) in the test image are associated with each of the artifact type(s). A dataset for training the model includes: (i) a reference category including reference image(s) without any artifacts; and (ii) artifact categories, each corresponding to a respective one of the artifact types and including noised images associated with the respective artifact type. Each noised image includes one of the reference images and an artifact associated with the respective artifact type. The model is trained to detect the artifact type(s) by providing the model with the dataset and causing the model to process differences between each noised image and the reference image in the noised image.

20 Claims, 4 Drawing Sheets

ARTIFICIAL INTELLIGENCE SOFTWARE FOR DOCUMENT QUALITY INSPECTION

BACKGROUND

Among artificial intelligence and machine learning technologies, a convolutional neural network (CNN) provides a deep learning model for processing data with a grid pattern, such as images. A CNN can automatically and adaptively learn spatial hierarchies of features, from low- to high-level patterns. The mathematical construct of a CNN generally employs three types of layers: convolution, pooling, and fully connected layers. The convolution and pooling layers perform feature extraction, and the fully connected layer maps the extracted features into a final output, such as classification. For digital images, pixel values are stored in a two-dimensional array of numbers, and an optimizable feature extractor (a small grid of parameters known as a kernel) is applied at each image position. As one layer feeds its output into the next layer, extracted features can hierarchically and progressively become more complex. The process of optimizing parameters, such as kernels, is known as training. Training minimizes the difference between outputs and ground truth labels through an optimization algorithm, such as backpropagation and gradient descent.

SUMMARY

Aspects of the present disclosure employ artificial intelligence and machine learning technologies, such as CNNs, to determine the quality of printed documents more efficiently and accurately.

According to an example implementation, a method produces a system to determine quality of images produced by a printer. The method includes determining one or more artifact types. One or more artifacts associated with the one or more artifact types appear in test images produced by one or more printers. The test images are reproductions of source images. The method includes generating a dataset including categories of images. The categories of images include a reference category including one or more reference images without any artifacts associated with the one or more artifact types. Additionally, the categories of images include one or more artifact categories. Each artifact category corresponds to a respective one of the artifact types and includes noised images associated with the respective artifact type. Each noised image includes one of the reference images and an artifact associated with the respective artifact type. The method includes training a model implemented on a computer system. The training includes providing the model with the dataset. The training includes causing the model to process differences between each noised image and the reference image included in the noised image thereby allowing the model to detect the one or more artifacts associated with the one or more artifact types. The method includes configuring the model to: receive the test images produced by the one or more printers and the source images corresponding to the test images; detect the one or more artifacts associated with the one or more artifact types appearing in the test images relative to the corresponding source images reproduced in the test images; and output information relating to the one or more artifacts detected by the model in the test images.

According to an example implementation, a system determines quality of images produced by a printer. The system includes one or more computer storage devices configured to store a model to detect one or more artifacts associated with one or more artifact types appearing in a test image produced by a printer, the test image being a reproduction of a source image. The system includes one or more processors configured to execute instructions implementing the model. The instructions cause the one or more processors to: receive the test image and the source image; determine differences between the test image and the source image; calculate, based on the differences between the test image and the source image, probabilities that the one or more artifacts in the test image are associated with each of the one or more artifact types; and output the probabilities to indicate the quality of the test image relative to the source image. The model is trained to detect the one or more artifact types by generating a dataset including categories of images. The categories of images include a reference category including one or more reference images without any artifacts associated with the one or more artifact types. Additionally, the categories of images include one or more artifact categories. Each artifact category corresponds to a respective one of the artifact types and includes noised images associated with the respective artifact type. Each noised image includes one of the reference images and an artifact associated with the respective artifact type. The model is further trained by providing the model with the dataset and causing the model to process differences between each noised image and the reference image included in the noised image.

According to an example implementation, one or more non-transitory computer-readable storage media includes computer-executable instructions stored thereon. When executed by a one or more processors, the computer-executable instructions cause the one or more processors to receive a test image produced by a printer and a source image, wherein the test image is a reproduction of the source image, and one or more artifacts associated with one or more artifact types appear in the test image; determine differences between the test image and the source image; calculate, based on the differences between the test image and the source image, probabilities that the one or more artifacts in the test image are associated with each of the one or more artifact types; and output the probabilities to indicate the quality of the test image relative to the source image. The instructions implement a model that is trained to detect the one or more artifact types by generating a dataset including categories of images. The categories of images include a reference category including one or more reference images without any artifacts associated with the one or more artifact types. Additionally, the categories of images include one or more artifact categories. Each artifact category corresponds to a respective one of the artifact types and including noised images associated with the respective artifact type. Each noised image including one of the reference images and an artifact associated with the respective artifact type. The model is further trained to detect the one or more artifact types by providing the model with the dataset, and causing the model to process differences between each noised image and the reference image included in the noised image.

In the example implementations, the model may be a convolutional neural network model.

In the example implementations, the one or more artifact types may include at least one of (i) horizontal banding, (ii) vertical misalignment or banding, (iii) incorrect or missing colors, (iv) blurriness or smearing, or (v) marking produced by a roller of the printer.

In the example implementations, the information relating to the one or more artifacts detected by the model may be output as probabilities that the one or more artifacts detected by the model in the test images are associated with each of the one or more artifact types. The probabilities may be output as a vector wherein the components of the vector include a probability associated with each of the one or more artifact types.

In the example implementations, training the model may further include: receiving, from the model, predictions of the one or more artifacts associated with the one or more artifact types appearing in the noised images; determining a difference between the predictions and the actual one or more artifacts appearing in the noised images; and adjusting weights in the model to minimize the difference between the predictions and the actual one or more artifacts appearing in the noised images.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of illustrative examples of the present disclosure when read in conjunction with the accompanying figures, wherein:

FIG. 1A illustrates an example reference image.

FIG. 1B illustrates an example image with a horizontal banding as an artifact.

FIG. 1C illustrates an example image with a vertical misalignment or banding as an artifact.

FIG. 1D illustrates an example image with incorrect or missing colors as an artifact.

FIG. 1E illustrates an example image with blurriness or smearing as an artifact.

FIG. 1F illustrates an example image with a marking produced by a roller of the printer as an artifact.

DETAILED DESCRIPTION

Figure 2:
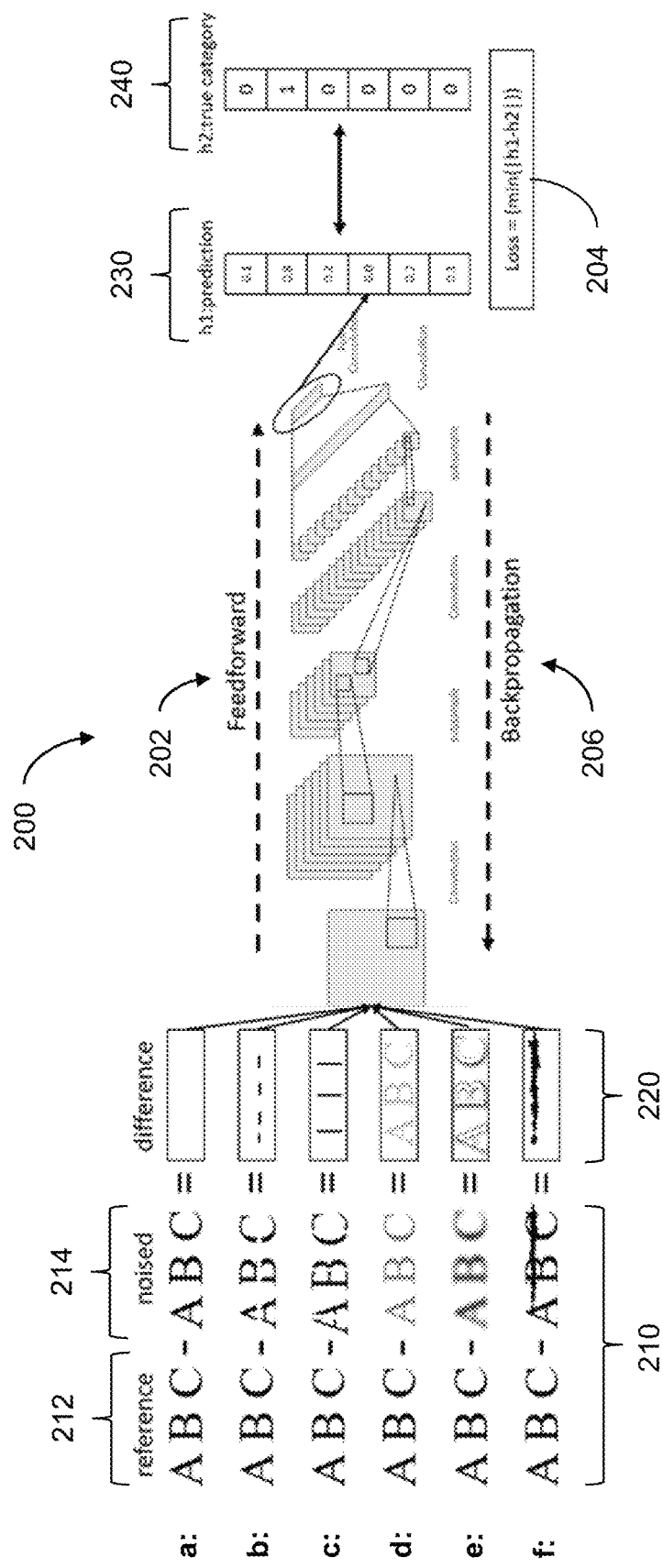
FIG. 2 illustrates an example architecture for training a CNN model.

The quality of a printed document can be characterized in terms of different types of artifacts that may appear in the printed document. Types of artifacts may include (i) horizontal banding, (ii) vertical misalignment or banding, (iii) incorrect or missing color(s), (iv) blurriness or smearing, or (v) marking(s) produced by a roller of the printer. For example, relative to a reference image 100a as shown in FIG. 1A, image 100b in FIG. 1B illustrates horizontal banding 10b as an artifact; image 100c in FIG. 1C illustrates vertical misalignment or banding 10c as an artifact; image 100d in FIG. 1D illustrates incorrect or missing colors as an artifact; image 100e in FIG. 1E illustrates blurriness or smearing as an artifact; and image 100f in FIG. 1F illustrates a marking 10f produced by a roller of the printer as an artifact.

The quality of a printed document can be determined according to visual inspection by a human tester. For instance, the human tester can print a reference document with a verified printer and print the same document with a test printer. The human tester can then conduct the visual inspection by comparing corresponding pages of the reference document and the test document to identify artifacts. Visual inspection by a human tester, however, can be inefficient and can produce inaccuracies if there are many documents to inspect. Additionally, visual inspection by a human tester may not be able to identify artifacts that fall below the threshold of human visual perception. Furthermore, when many different human testers are employed, the subjective nature of visual inspection can produce inconsistent evaluations that are difficult to quantify according to a standard.

In contrast to visual inspection by a human tester, aspects of the present disclosure employ artificial intelligence and machine learning technologies to determine the quality of printed documents more efficiently and accurately. In particular, an example implementation produces a convolutional neural network (CNN) model that can detect and identify the artifacts in a printed document. Additionally, the CNN model can return a value indicating which and to what extent artifacts have been introduced by the test printer. In some implementations, the output of the CNN model may be employed as an initial step to identify test documents that may warrant closer examination for quality.

The CNN model may be trained to categorize and quantify the five types of artifacts shown in FIGS. 1B-F. As such, training involves six categories of images with labels 0 to 5, where label 0 indicates an image with no artifact, label 1 indicates an image with horizontal banding as an artifact, label 2 indicates vertical misalignment or banding as an artifact, label 3 indicates incorrect or missing color(s) as an artifact, label 4 blurriness or smearing as an artifact, and label 5 indicates, as an artifact, an image with marking(s) produced by a roller of the printer. Each label may be coded as a six-length one dimensional vector (i.e., one-hot-encoding) as shown in TABLE 1.

TABLE 1

| Artifact | Label | One-hot-encoding |
| --- | --- | --- |
| No artifact | 0 | 1 0 0 0 0 0 |
| Horizontal banding | 1 | 0 1 0 0 0 0 |
| Vertical misalignment/banding | 2 | 0 0 1 0 0 0 |
| Incorrect/missing color(s) | 3 | 0 0 0 1 0 0 |
| Blurriness/smearing | 4 | 0 0 0 0 1 0 |
| Roller marking | 5 | 0 0 0 0 0 1 |

To generate a dataset to train the CNN model, a scanned image of a document with no artifacts is used as a reference image for all categories of images. For each type of artifact, a corresponding artifact is randomly applied to the reference image to produce a noised image. For instance, a noised image corresponding to the horizontal banding artifact is produced by applying random horizontal banding noise to the reference image. In the dataset, each noised image is paired with the reference image and matched with the corresponding label (reference image, noised image, and label). The dataset may be generated with any number of noised images produced from more than one reference image.

FIG. 2 illustrates an example architecture for training a CNN model 200. As shown in FIG. 2, a dataset 210 for training the CNN model 200 includes reference images 212 and noised images 214 for all six categories of images with labels 0-5: reference images 212a and noised images 214a associated with no artifact (label 0), reference images 212b and noised image(s) 214b associated with horizontal banding as an artifact (label 1), reference image(s) 212c and noised image(s) 214c associated with vertical misalignment or banding as an artifact (label 2), reference image(s) 212d and noised image(s) 214d associated with incorrect or missing color(s) as an artifact (label 3), reference image(s) 212e and noised image(s) 214e associated with blurriness or smearing as an artifact (label 4), and reference image(s) 212f and noised image(s) 214f associated with marking(s) produced by a roller of the printer as an artifact (label 5). As described above, the labels may be coded with six-length one dimensional vectors.

During preprocessing, the reference images 212a-f are subtracted from the noised images 214a-f to determine pixel-wise differences 220a-f, respectively. To determine the pixel-wise differences 220a-f, for instance, the noised images 214a-f may be registered to and aligned with the corresponding reference images 212a-f via the Oriented FAST and Rotated BRIEF (ORB) method. The pixel-wise differences 220a-f reveal the artifacts applied to the reference image 212a-f to generate the corresponding noised images 214a-f for the dataset 210.

The pixel-wise differences 220a-f are then randomly provided to the CNN model 200 as batch input images 220 for training. Based on a feedforward process 202, the CNN model 200 outputs category predictions 230 indicating the probability that each type of artifact appears in each of the input images 220. For each of the input images 220, a loss function calculates a loss 204 by subtracting the category prediction 230 from the ground-truth label 240, i.e., the vector indicating the actual type of artifact appearing in the input image 220. The loss 204, for instance, may be determined by the cosine similarity method. Weights for the CNN model 200 are then adjusted, via backpropagation process 206, to minimize the loss 204.

When the training is completed, the CNN model 200 may be tuned to provide probabilities that a test image includes artifacts associated with each of the six categories of images. When evaluating a test image, the CNN model 200 processes differences between the test image and the corresponding reference image. The CNN model 200 calculates the probability for each type of artifact (including no artifact). For instance, the CNN model 200 may return an output with the vector (0.1 0.8 0.2 0.0 0.2 0.1), which indicates that the test image contains mostly horizontal banding, with some vertical misalignment/banding, blurriness/smearing, and roller marking. On the other hand, the CNN model 200 may return an output with the vector (0.9 0.01 0 0 0 0), which indicates that test image has very insignificant artifact.

Figure 3:
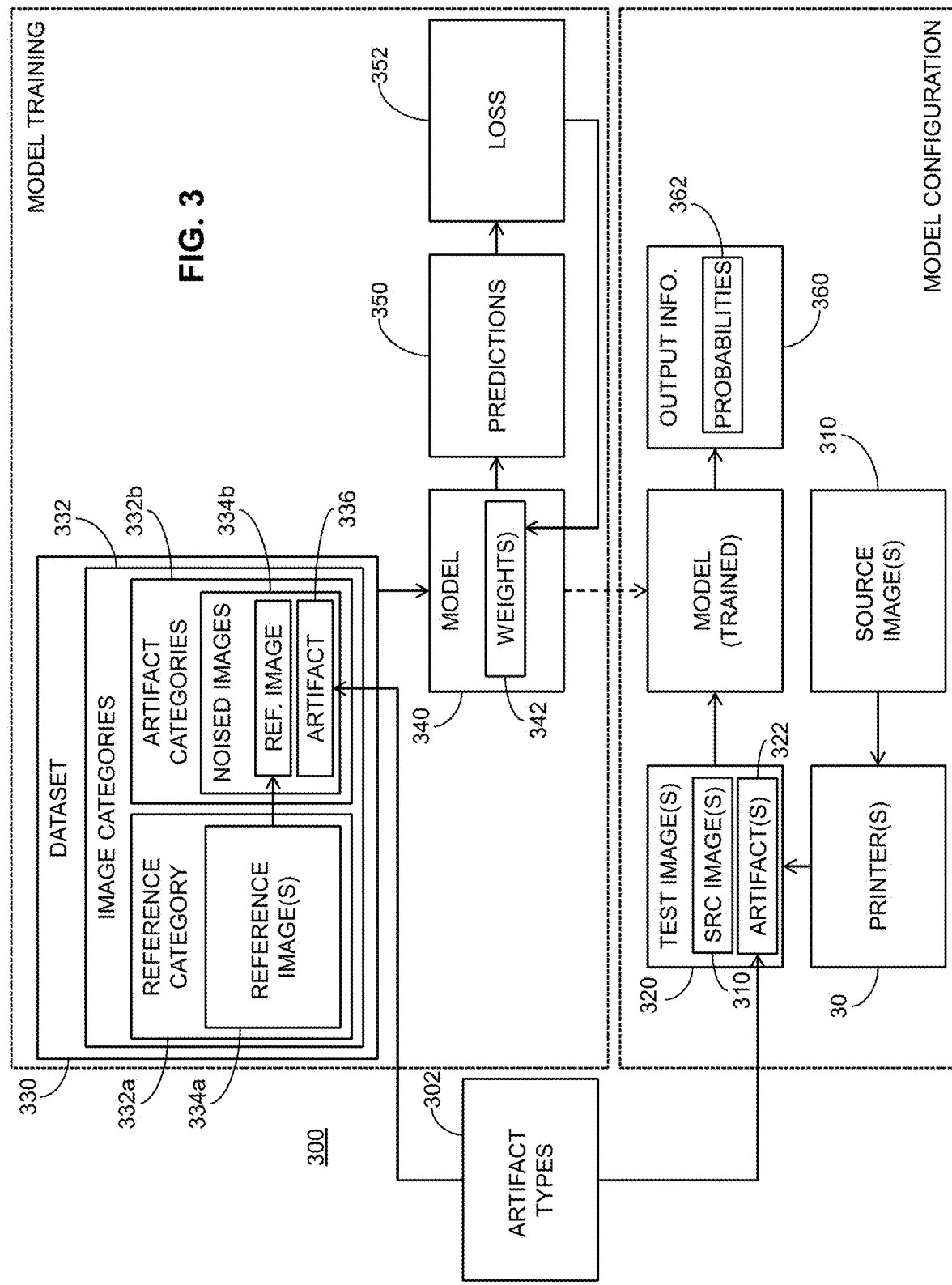
FIG. 3 illustrates an example method for producing a system to determine the quality of test images produced by one or more printers as reproductions of source images.

FIG. 3 illustrates an example method 300 for producing a system to determine the quality of test images 320 produced by one or more printers 30 as reproductions of source images 310. The method 300 trains a model 340, such as a CNN model, stored on a computer system. When the model 340 is trained, the method 300 configures the model 340 to receive the test images 320 and the source images 310 corresponding to the test images 320. In particular, the model 340 determines the quality of the test images 320 based on the appearance of one or more artifact types 302. For instance, the one or more artifact types 302 may include at least one of: (i) horizontal banding, (ii) vertical misalignment or banding, (iii) incorrect or missing colors, (iv) blurriness or smearing, or (v) marking produced by a roller of the printer. One or more artifacts 322 associated with the one or more artifact types 302 appear in the test images 320.

To train the model 340, the method 300 generates a dataset 330, which includes categories of images 332. The categories of images include a reference category 332a including one or more reference images 334a without any artifacts associated with the one or more artifact types 302. The categories of images 332 also include one or more artifact categories 332b, where each artifact category 332b corresponds to a respective one of the artifact types 302 and includes noised images 334b associated with the respective artifact type 302. Each noised image 334b includes one of the reference images 334a and an artifact 336 associated with the respective artifact type 302.

Training the model 340 includes providing the model 340 with the dataset 330. Additionally, the training includes causing the model 340 to process, in the dataset 130, differences between each noised image 334b and the reference image 334a included in the noised image 334b, thereby allowing the model 340 to detect the one or more artifacts 322 associated with the one or more artifact types 302. Processing the differences between each noised image 334b and the reference image 334a included in the noised image 334b may include measuring pixel-wise differences between each noised image 334b and the reference image 334a included in the noised image 334b. Processing the differences between each noised image 334b and the reference image 334a included in the noised image 334b may also include registering each noised image 334b and the reference image 334a included in the noised image 334b so that the differences are associated with the artifact 336 in the noised image 334b.

In some implementations, training the model 340 may further include: (i) receiving, from the model 340, predictions 350 of the one or more artifacts 322 associated with the one or more artifact types 302 appearing in the noised images 334b; (ii) determining a difference 352 (i.e., loss) between the predictions 350 and the actual one or more artifacts 336 appearing in the noised images 334b; and (iii) adjusting weights 342 in the model 340 to minimize the difference 352 between the predictions 350 and the actual one or more artifacts 336 appearing in the noised images 334b.

After training the model 340, the method 300 configures the model 340 to receive the test images 320 and the source images 310 corresponding to the test images 320. The model 340 is configured to detect the one or more artifacts 322 associated with the one or more artifact types 302 appearing in the test images 320 relative to the corresponding source images 310 reproduced in the test images 320. Additionally, the model 340 is configured to output information 360 relating to the one or more artifacts 322 detected by the model 340 in the test images 320. For instance, the information 360 relating to the one or more artifacts detected by the model 340 is output as probabilities 362 that the one or more artifacts 322 detected by the model 340 in the test images 320 are associated with each of the one or more artifact types 302. In particular, the probabilities 362 may be output as a vector wherein the components of the vector include a probability associated with each of the one or more artifact types 302. Accordingly, FIG. 3 illustrates aspects of training and configuring a model to produce a system to determine the quality of test images 320 produced by one or more printers 30 as reproductions of source images 310.

Figure 4:
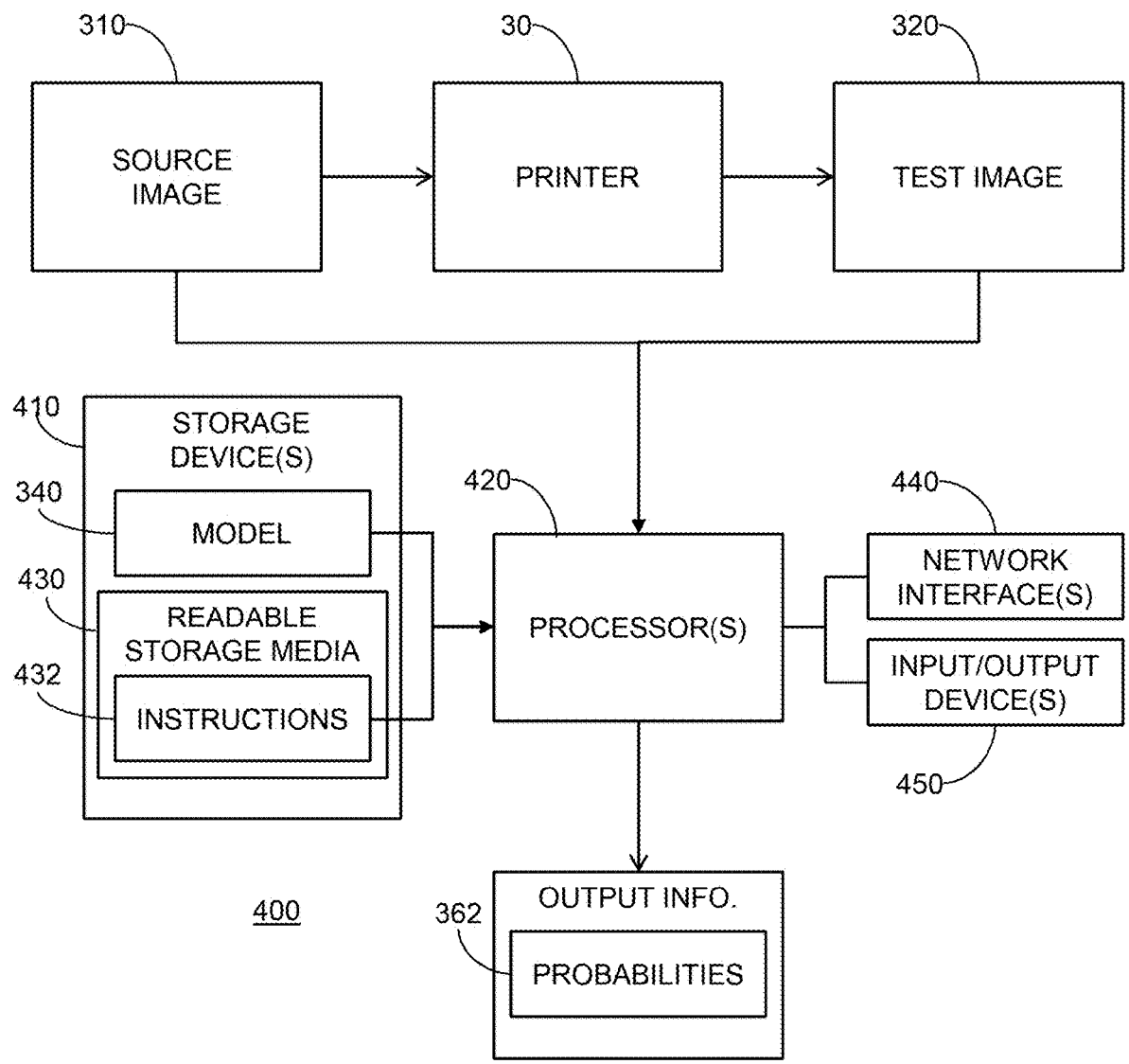
FIG. 4 illustrates an example system for determining the quality of images produced by a printer.

Correspondingly, FIG. 4 illustrates an example system 400 for determining the quality of a test image 320 produced by the printer 30 as a reproduction of a source image 310.

The system 400 includes one or more computer storage devices 410 configured to store the model 340. As described above, the model 340 may be a CNN model that is trained and configured according to the method 300 to detect one or more artifacts 322 associated with one or more artifact types 302 appearing in the test image 320.

The system 400 also includes one or more processors 420. The one or more computer storage devices 410 also includes one or more non-transitory computer-readable storage media 430 configured to store instructions 432 for execution by the one or more processors 420. Implementing the model 340, the instructions 432 cause the one or more processors 420 to: (i) receive the test image 320 and the source image 310; (ii) determine differences between the test image 320 and the source image 310; (iii) calculate, based on the differences between the test image 320 and the source image 310, probabilities 362 that the one or more artifacts 322 in the test image 320 are associated with each of the one or more artifact types 302; and (iv) output the probabilities 362 to indicate the quality of the test image 320 relative to the source image 310.

The one or more processors 420 may include one or more central processing units (CPUs), such as one or more general purpose processors and/or one or more dedicated processors (e.g., application specific integrated circuits also known as ASICs or digital signal processors also known as DSPs, etc.). The one or more computer storage devices 410 may include volatile and/or non-volatile data storage and may be integrated in whole or in part with the one or more processors 420. In general, the one or more computer storage devices 410 may store program instructions, executable by the one or more processors 420, and data that are manipulated by these instructions to carry out the various methods, processes, or functions described herein. Alternatively, these methods, processes, or functions can be defined by hardware, firmware, and/or any combination of hardware, firmware and software. Therefore, the one or more computer storage devices 410 may include a tangible, non-transitory computer-readable medium, having stored thereon program instructions that, upon execution by one or more processors, cause the system 400 to carry out any of the methods, processes, or functions disclosed in this specification or the accompanying drawings.

The system 400 may also include a network interface 440 and input/output devices 450, all of which may be coupled by a system bus or a similar mechanism. The network interface 440 may be employed to receive input, such as the input from the printer 30 described above, or to provide output, such as the output described above. The network interface 440 may take the form of a wire line connection, such as an Ethernet, Token Ring, or T-carrier connection. The network interface 440 may alternatively take the form of a wireless connection, such as WiFi, BLUETOOTH®, or a wide-area wireless connection. However, other forms of physical layer connections and other types of standard or proprietary communication protocols may be used over network interface 440. Furthermore, network interface 440 may comprise multiple physical communication interfaces. Additionally, the computing system 400 may support remote access from another device, via the network interface 440 or via another interface, such as an RS-132 or Universal Serial Bus (USB) port.

The input/output devices 450 may facilitate user interaction with the system 400. The input/output devices 450 may include multiple types of input devices, such as a keyboard, a mouse, a touch screen, a microphone and/or any other device that is capable of receiving input from a user. Similarly, the input/output devices 450 may include multiple types of output devices, such as a printing device, a display, one or more light emitting diodes (LEDs), speaker, or any other device that is capable of providing output discernible to a user. For instance, the printing device can print the output image. Additionally or alternatively, the display device can display the output image.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for producing a system to determine quality of images produced by a printer, the method comprising:
   determining one or more artifact types, wherein one or more artifacts associated with the one or more artifact types appear in test images produced by one or more printers, the test images being reproductions of source images;
   generating a dataset including categories of images, the categories of images including:
      a reference category including one or more reference images without any artifacts associated with the one or more artifact types, and
      one or more artifact categories, each artifact category corresponding to a respective one of the artifact types and including noised images associated with the respective artifact type, each noised image including one of the reference images and an artifact associated with the respective artifact type;
   training a model implemented on a computer system, wherein the training includes:
      providing the model with the dataset; and
      causing the model to process differences between each noised image and the reference image included in the noised image thereby allowing the model to detect the one or more artifacts associated with the one or more artifact types; and
   configuring the model to:
      receive the test images produced by the one or more printers and the source images corresponding to the test images;
      detect the one or more artifacts associated with the one or more artifact types appearing in the test images relative to the corresponding source images reproduced in the test images; and
      output information relating to the one or more artifacts detected by the model in the test images.

2. The method of claim 1, wherein the one or more artifact types include at least one of (i) horizontal banding, (ii)

vertical misalignment or banding, (iii) incorrect or missing colors, (iv) blurriness or smearing, or (v) marking produced by a roller of the printer.

3. The method of claim 1, wherein the output information relating to the one or more artifacts detected by the model is output as probabilities that the one or more artifacts detected by the model in the test images are associated with each of the one or more artifact types.

4. The method of claim 3, wherein the probabilities are output as a vector wherein components of the vector include a probability associated with each of the one or more artifact types.

5. The method of claim 1, wherein training the model further includes:
receiving, from the model, predictions of the one or more artifacts associated with the one or more artifact types appearing in the noised images;
determining a difference between the predictions and the actual one or more artifacts appearing in the noised images; and
adjusting weights in the model to minimize the difference between the predictions and the actual one or more artifacts appearing in the noised images.

6. The method of claim 1, wherein processing the differences between each noised image and the reference image included in the noised image includes measuring pixel-wise differences between each noised image and the reference image included in the noised image.

7. The method of claim 1, wherein processing the differences between each noised image and the reference image included in the noised image includes registering each noised image and the reference image included in the noised image so that the differences are associated with the artifact in the noised image.

8. The method of claim 1, wherein the model is a convolutional neural network model.

9. A system for determining quality of images produced by a printer, the system comprising:
one or more computer storage devices configured to store a model to detect one or more artifacts associated with one or more artifact types appearing in a test image produced by a printer, the test image being a reproduction of a source image; and
one or more processors configured to execute instructions implementing the model, the instructions causing the one or more processors to:
receive the test image and the source image;
determine differences between the test image and the source image;
calculate, based on the differences between the test image and the source image, probabilities that the one or more artifacts in the test image are associated with each of the one or more artifact types; and
output the probabilities to indicate the quality of the test image relative to the source image,
wherein the model is trained to detect the one or more artifact types by:
generating a dataset including categories of images, the categories of images including:
a reference category including one or more reference images without any artifacts associated with the one or more artifact types, and
one or more artifact categories, each artifact category corresponding to a respective one of the artifact types and including noised images associated with the respective artifact type, each noised image including one of the reference images and an artifact associated with the respective artifact type;
providing the model with the dataset; and
causing the model to process differences between each noised image and the reference image included in the noised image.

10. The system of claim 9, wherein the one or more artifact types include at least one of (i) horizontal banding, (ii) vertical misalignment or banding, (iii) incorrect or missing colors, (iv) blurriness or smearing, or (v) marking produced by a roller of the printer.

11. The system of claim 9, wherein the model is further trained by:
receiving, from the model, predictions of the one or more artifacts associated with the one or more artifact types appearing in the noised images;
determining a difference between the predictions and the actual one or more artifacts appearing in the noised images; and
adjusting weights in the model to minimize the difference between the predictions and the actual one or more artifacts appearing in the noised images.

12. The system of claim 9, wherein the model processes the differences between each noised image and the reference image included in the noised image by measuring pixel-wise differences between each noised image and the reference image included in the noised image.

13. The system of claim 9, wherein the model processes the differences between each noised image and the reference image included in the noised image by registering each noised image and the reference image included in the noised image so that the differences are associated with the artifact in the noised image.

14. The system of claim 9, wherein the model is a convolutional neural network model.

15. One or more non-transitory computer-readable storage media, having computer-executable instructions stored thereon, wherein when executed by a one or more processors, the computer-executable instructions cause the one or more processors to:
receive a test image produced by a printer and a source image, wherein the test image is a reproduction of the source image, and one or more artifacts associated with one or more artifact types appear in the test image;
determine differences between the test image and the source image;
calculate, based on the differences between the test image and the source image, probabilities that the one or more artifacts in the test image are associated with each of the one or more artifact types; and
output the probabilities to indicate a quality of the test image relative to the source image,
wherein the instructions implement a model that is trained to detect the one or more artifact types by:
generating a dataset including categories of images, the categories of images including:
a reference category including one or more reference images without any artifacts associated with the one or more artifact types, and
one or more artifact categories, each artifact category corresponding to a respective one of the artifact types and including noised images associated with the respective artifact type, each noised image including one of the reference images and an artifact associated with the respective artifact type;
providing the model with the dataset; and causing the model to process differences between each noised image and the reference image included in the noised image.

16. The non-transitory computer-readable storage media of claim 15, wherein the one or more artifact types include at least one of (i) horizontal banding, (ii) vertical misalignment or banding, (iii) incorrect or missing colors, (iv) blurriness or smearing, or (v) marking produced by a roller of the printer.

17. The non-transitory computer-readable storage media of claim 15, wherein the model is further trained by:
   receiving, from the model, predictions of the one or more artifacts associated with the one or more artifact types appearing in the noised images;
   determining a difference between the predictions and the actual one or more artifacts appearing in the noised images; and
   adjusting weights in the model to minimize the difference between the predictions and the actual one or more artifacts appearing in the noised images.

18. The non-transitory computer-readable storage media of claim 15, wherein the model processes the differences between each noised image and the reference image included in the noised image by measuring pixel-wise differences between each noised image and the reference image included in the noised image.

19. The non-transitory computer-readable storage media of claim 15, wherein the model processes the differences between each noised image and the reference image included in the noised image by registering each noised image and the reference image included in the noised image so that the differences are associated with the artifact in the noised image.

20. The non-transitory computer-readable storage media of claim 15, wherein the model is a convolutional neural network model.

* * * * *